US006898070B2

(12) United States Patent
Korony et al.

(10) Patent No.: US 6,898,070 B2
(45) Date of Patent: May 24, 2005

(54) TRANSMISSION LINE CAPACITOR (75) Inventors: George Korony, Myrtle Beach, SC (US); Andrew P. Ritter, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 10/733,848

(22) Filed: Dec. 11, 2003

(65) Prior Publication Data

US 2004/0136141 A1 Jul. 15, 2004

Related U.S. Application Data

(60) Provisional application No. 60/434,930, filed on Dec. 19, 2002.

(51) Int. Cl.[7] .............................................. H01G 4/228
(52) U.S. Cl. .................... 361/306.3; 361/361; 361/328; 361/312; 333/184; 333/185
(58) Field of Search .............................. 361/302, 306.1, 361/308.1, 517–520, 535–538, 540, 306.3, 303, 321.2, 328, 329; 607/5; 29/25.41, 25.42; 333/184, 185

(56) References Cited

U.S. PATENT DOCUMENTS

| | | | |
|---|---|---|---|
| 3,210,607 A | 10/1965 | Flanagan | |
| 3,699,620 A | 10/1972 | Asher et al. | |
| 3,883,784 A | 5/1975 | Peck et al. | |
| 4,464,701 A | 8/1984 | Roberts et al. | |
| 4,853,827 A | 8/1989 | Hernandez | |
| 5,412,357 A | * 5/1995 | Nakamura et al. | 333/181 |
| 5,517,385 A | 5/1996 | Galvagni et al. | |
| 5,561,586 A | 10/1996 | Tomohiro et al. | |
| 5,583,738 A | 12/1996 | Kohno et al. | |
| 5,625,528 A | 4/1997 | Devoe et al. | |
| 5,779,379 A | 7/1998 | Mason et al. | |
| 5,883,781 A | 3/1999 | Yamamichi et al. | |
| 6,023,408 A | 2/2000 | Schaper | |
| 6,049,472 A | * 4/2000 | Suzuki et al. | 363/37 |
| 6,072,690 A | 6/2000 | Farooq et al. | |
| 6,094,112 A | * 7/2000 | Goldberger et al. | 333/185 |
| 6,094,335 A | 7/2000 | Early | |
| 6,108,191 A | 8/2000 | Bruchhaus et al. | |

(Continued)

FOREIGN PATENT DOCUMENTS

| | | |
|---|---|---|
| JP | 1189997 A | 7/1989 |
| JP | 6290984 | 10/1994 |

OTHER PUBLICATIONS

English language Abstract of JP 6–290984 referenced above.
English language Abstract of JP 1–189997 referenced above.

*Primary Examiner*—Anthony Dinkins
(74) *Attorney, Agent, or Firm*—Dority & Manning (57) ABSTRACT

A transmission line capacitor includes at least two side-by-side capacitor portions spaced apart between a separating portion all contained in a single monolithic body. Such transmission line capacitors provide specific capacitor functionality for parallel transmission lines in a printed circuit board environment, while also maintaining a desired impedance value between the transmission paths. The transmission line capacitors offer both biasing functionality for blocking undesired DC voltages as well as AC coupling functionality for passing AC voltage signals with preserved data integrity. A first embodiment may be formed with a dielectric material having a relatively low dielectric constant, allowing high capacitor "height" with fixed spacing between distinct capacitive structures. Another embodiment may be formed with a relative high K dielectric and then slotted with an air gap between capacitive structures. Yet another embodiment may be formed with a relatively high K dielectric material, and with a relatively low K material provided in between capacitive structures. A still further embodiment concerns a transmission line capacitor design formed with high K and low K dielectric materials punched into a monolithic thin-film device.

32 Claims, 6 Drawing Sheets

U.S. PATENT DOCUMENTS

| | | |
|---|---|---|
| 6,111,744 A | 8/2000 | Doan |
| 6,194,667 B1 * | 2/2001 | Jimarez et al. ............. 174/261 |
| 6,208,501 B1 | 3/2001 | Ingalls et al. |
| 6,272,003 B1 | 8/2001 | Schaper |
| 6,275,370 B2 | 8/2001 | Gnade et al. |
| 6,300,267 B1 | 10/2001 | Chen et al. |
| 6,424,235 B1 * | 7/2002 | Kato ........................... 333/185 |
| 6,424,236 B1 * | 7/2002 | Kato ........................... 333/185 |
| 6,437,666 B1 * | 8/2002 | Matsumura et al. ........ 333/185 |
| 6,804,127 B2 * | 10/2004 | Zhou ........................... 363/37 |

* cited by examiner

TRANSMISSION LINE CAPACITOR

PRIORITY CLAIM

This application claims the benefit of previously filed U.S. Provisional Patent Application entitled "Transmission Line Capacitor," assigned U.S. Ser. No. 60/434,930, filed Dec. 19, 2002, and which is incorporated herein by reference for all purposes.

BACKGROUND OF THE INVENTION

The present subject matter generally concerns a coupling capacitor for use in conjunction with components and signal connections in a printed circuit board (PCB) environment. At least two capacitor structures are provided in a single monolithic device to form a transmission line capacitor in accordance with the present subject matter.

A transmission line is generally defined as two or more parallel conductors used to connect a source to a load. Such terminology often conjures thoughts of power generation and distribution systems that utilize large-scale transmission lines to transport electrical energy among multiple sources and loads of a power network. However, transmission lines are not only utilized in large-scale environments; in fact, even the smallest electrical applications often employ transmission line configurations for energy distribution. An example of a particular such application, generally the focus of the present subject matter, corresponds to transmission lines that are implemented on a printed circuit board (PCB) environment by parallel signal traces that connect various components or connection points.

PCB "transmission lines" have proven quite useful for many conventional circuit applications, especially those utilizing relatively high frequency signals. However, high-frequency signals traveling in such a fashion may be readily susceptible to a variety of undesirable signal-altering phenomena, including noise spikes that can alter signal data and cause data errors as well as impedance variations in a signal path that can cause signal reflections.

Capacitors are often used to help regulate a transmitted signal and ensure that undesirable signal-altering phenomena is minimized. For many applications, capacitors are desirable that have the biasing capability for blocking DC components of a transmitted signal and the coupling capability for passing AC voltage components (often the "data" portion of a signal.) Such capacitors will be hereafter referred to as coupling capacitors, and should be distinguished from decoupling capacitors which typically block AC signal propagation. Coupling and decoupling of transmitted signals often becomes even more important when such transmitted signals are characterized by relatively high frequencies. Examples of capacitor technology for use in accordance with high frequency signaling applications are disclosed in U.S. Pat. No. 6,272,003 B1 (Schaper) and U.S. Pat. No. 6,023,408 (Schaper).

A coupling capacitor in a transmission line environment may require unique design considerations. Transmission lines are typically characterized by a certain impedance, which is preferably maintained in as constant a fashion as possible along the signal traces that form each respective signal transmission path. Maintaining a relatively constant transmission line impedance helps to ensure signal integrity.

Determination and preservation of certain capacitor performance characteristics is often addressed by the selection of materials used in such devices. As known in the art, multilayer capacitors typically comprise materials for forming at least two major physical structures, the conductive electrode plates and adjacent dielectric portions. Particularly, the selection of dielectric materials for use in capacitor devices can greatly affect component design and functionality due to availability of dielectrics with a wide range of different dielectric constants (K).

Examples of electronic devices that employ materials with relatively high dielectric constants for selected component features include U.S. Pat. No. 6,275,370 B2 (Gnade et al.), U.S. Pat. No. 5,883,781 (Yamamichi et al.), U.S. Pat. No. 4,853,827 (Hernandez), U.S. Pat. No. 4,464,701 (Roberts et al.), U.S. Pat. No. 3,883,784 (Peek et al.), and Japanese Patent No. JP6290984 (Kuroiwa et al.).

Many electronic devices, particularly capacitive structures, employ a combination of materials with different dielectric constants in a single structure. Such combination of dielectric materials may often yield a device with a wider range of functionality or given performance characteristic (s). U.S. Pat. No. 5,779,379 (Galvagni et al.), U.S. Pat. No. 5,517,385 (Galvagni et al.), U.S. Pat. No. 6,108,191 (Bruchhaus et al.), U.S. Pat. No. 6,072,690 (Faroog et al.) and Japanese Patent No. JP1189997A (Takaaki et al.) disclose exemplary electronic devices that incorporate different dielectric materials. Similarly, U.S. Pat. No. 3,210,607 (Flanagan) provides an example of an apparatus with different ferromagnetic materials provided therewith.

Yet another reference disclosing aspects of the formation of capacitive structures utilizing different dielectric materials is U.S. Pat. No. 5,583,738 (Kohno et al.). Such reference provides for a capacitor array with distinct capacitive units separated from each other by a layer having a lower dielectric constant than that of the material used in the capacitive units themselves. Such disclosed capacitive structure may be suitable for use in a printed circuit board environment.

Additional background references that address aspects of capacitor design and/or related selection of dielectric materials include U.S. Pat. No. 6,300,267 B1 (Chen et al.), U.S. Pat. No. 6,208,501 B1 (Ingalls et al.), U.S. Pat. No. 6,111,744 (Doan), U.S. Pat. No. 6,094,335 (Early), U.S. Pat. No. 5,561,586 (Tomohiro et al.), and U.S. Pat. No. 3,699,620 (Asher et al.).

While various aspects and alternative features are known in the field of chip-type capacitors and dielectric portions thereof, no one design has emerged that generally addresses all of the issues as discussed herein. The disclosures of all the foregoing United States patents are hereby fully incorporated into this application for all purposes by reference thereto.

BRIEF SUMMARY OF THE INVENTION

The present subject matter recognizes and addresses various issues as previously discussed, and others concerning certain aspects of coupling capacitors and printed circuit board (PCB) applications. Thus, broadly speaking, a principal object of the presently disclosed technology is an improved coupling device for use in conjunction with components and signal connections in a printed circuit board (PCB) environment. More particularly, a transmission line capacitor including at least two distinct capacitive devices in a single monolithic structure is provided.

A principal object of the present subject matter is to provide a capacitor configuration for series combination in signal transmission paths on a PCB or other substrate where the configuration provides capacitance functions while also maintaining a desired impedance value between the transmission paths.

Another principal object of the present subject matter is to provide a transmission line capacitor that offers both biasing functionality for blocking undesired DC voltages as well as AC coupling functionality for passing AC voltage signals with preserved data integrity.

A still further object of the disclosed technology is to provide a variety of potential transmission line capacitor embodiments for preserving signal path impedance and offering desired functionality. Such differing embodiments may incorporate, for example, materials with different dielectric constants provided in specifically designed configurations. More particularly, relatively high K (K>50) and/or low K (K<20) dielectric materials can be provided in a capacitor structure designed with specific dimensions such as active height and spacing between capacitor plates.

Additional objects and advantages of the present subject matter are set forth in, or will be apparent to those of ordinary skill in the art from, the detailed description herein. Also, it should be further appreciated by those of ordinary skill in the art that modifications and variations to the specifically illustrated, referenced, and discussed features hereof may be practiced in various embodiments and uses of the disclosed technology without departing from the spirit and scope thereof, by virtue of present reference thereto. Such variations may include, but are not limited to, substitution of equivalent means and features, or materials for those shown, referenced, or discussed, and the functional, operational, or positional reversal of various parts, features, or the like.

Still further, it is to be understood that different embodiments, as well as different presently preferred embodiments, of the disclosed technology may include various combinations or configurations of presently disclosed features or elements, or their equivalents (including combinations of features or configurations thereof not expressly shown in the figures or stated in the detailed description).

A first exemplary embodiment of the present subject matter relates to a transmission line capacitor that includes at least two multilayer capacitors provided in a side-by-side configuration in a monolithic device, wherein each capacitor is separated from an adjacent capacitor by an additional portion of dielectric material. The dielectric material utilized in forming the respective multilayer capacitors and the separation portion may preferably be a relatively low-K (e.g., K~8) dielectric material. The height and spacing of each capacitor in such transmission line capacitor embodiment may be specifically designed to yield a given capacitance per capacitor while maintaining a given line-to-line impedance between signal paths within the device.

Another exemplary embodiment of the disclosed technology concerns a transmission line capacitor formed with at least two multilayer capacitors formed within a body of dielectric material and provided between a separating portion of such dielectric material. The dielectric material in accordance with such embodiment may be a relatively high dielectric constant. An air gap is preferably cut within the separating portion between each adjacent multilayer capacitor pair such that the capacitors are partially separated by the separating portion of dielectric material and also partially separated by the air gap. A relatively high capacitance is achievable with a transmission line capacitor in accordance with such exemplary embodiment.

Another exemplary embodiment of the presently disclosed technology corresponds to a transmission line capacitor formed with at least two multilayer capacitors formed within a body of first dielectric material and at least partially separated by a separating portion comprising a second different dielectric material. In some embodiments, the first dielectric material may have a relatively high dielectric constant, and the second dielectric material may have a relatively low dielectric constant. In some embodiments, the width spacing between adjacent capacitors may be completely separated by the second dielectric material.

Yet another exemplary embodiment of the present subject matter relates to a transmission line capacitor formed using punch press technology to punch layers of a first dielectric material and selectively interleaved active electrode layers to form a first multilayer capacitor portion. A separating portion is then formed by punching layers of a second dielectric material on top of the first multilayer capacitor portion. Additional layers of the first dielectric material in addition to more interleaved active electrode layers are then provided after the second dielectric material to form a completely symmetrical capacitor stack. Such thin-film press technology may be also applied to other embodiments of the disclosed technology.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE SEVERAL VIEWS OF THE DRAWING

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent same or analogous features or elements of the present technology.

DETAILED DESCRIPTION OF THE EMBODIMENTS

As referenced in the Brief Summary of the Invention section, the present subject matter is directed towards an improved coupling device for use in conjunction with components and signal connections in a printed circuit board (PCB) environment. Such a device preferably offers capacitive functionality for respective parallel signal transmission paths while also maintaining a critical impedance value between transmission paths, as displayed and discussed hereafter with respect to FIGS. 1A and 1B.

Several particular exemplary transmission line capacitor embodiments for maintaining desired performance characteristics as addressed herein are presented as follows. A first exemplary embodiment may be formed with a dielectric material having a relatively low dielectric constant, allowing high capacitor "height" with fixed spacing between distinct capacitive structures. Aspects of such first exemplary embodiment are presented with respect to FIGS. 2A–3B, respectively. A second exemplary transmission line capacitor embodiment, as presented with respect to FIGS. 4A and 4B, may be formed with a relatively high K dielectric and then slotted with an air gap between capacitive structures. A third exemplary embodiment, presented with respect to FIGS. 5A and 5B, may be formed with a relatively high K dielectric material, and with a relatively low K material provided in between capacitive structures. A fourth exemplary embodiment is displayed in FIGS. 6A and 6B, and concerns a transmission line capacitor design formed with high K and low K dielectric materials punched into a monolithic thin-film device.

Now referring more particularly to the drawings, FIG. 1 depicts an exemplary transmission line capacitor 10 positioned on a substrate 12. Substrate 12 may correspond to a printed circuit board or other environment in which signal paths 14 are provided to transmit signals. Signals transmitted via signal paths 14 may be characterized as AC "data" signals with DC bias voltages that are preferably blocked in certain applications. Coupling capacitors may be provided to pass selected AC portions of a transmitted signal while blocking selected DC signals. At the same time, it is desirable to maintain the given line/line (i.e., line-to-line) impedance between signal paths.

Figure 1A:
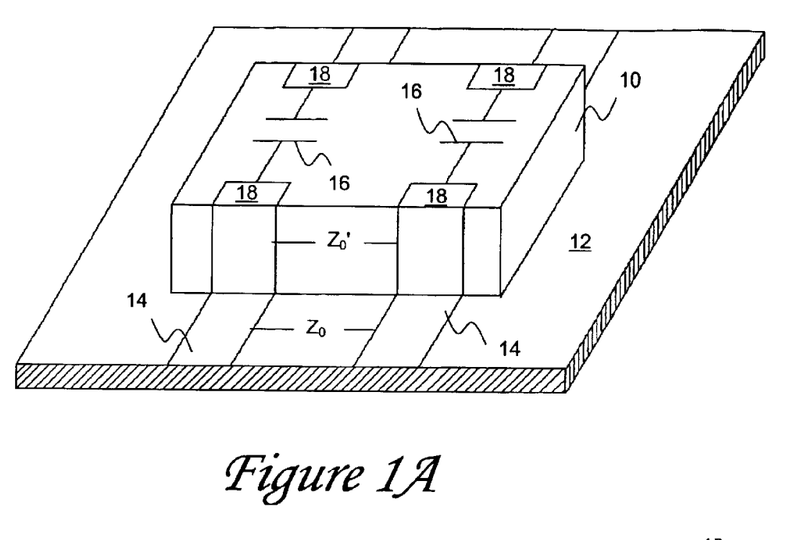
FIG. 1A provides a perspective view of an exemplary circuit board environment in combination with an exemplary transmission line capacitor embodiment of the present subject matter.

Assume that the two signal paths 14 of FIG. 1A are provided in a substantially parallel configuration with fixed spacing and a line/line impedance $Z_0$ of about 100 Ω. A transmission line capacitor provided at the signal paths 14 may include two parallel capacitors 16 in a single monolithic body 10 formed with a fixed spacing between capacitors 16 and a fixed height between top and bottom active layers of each respective capacitor 16. Such configuration of a transmission line capacitor 10 provides a capacitance (for example, of about 100 pF) in each signal path, while maintaining a line/line impedance $Z_0'$ approximately equal to $Z_0$. Thus, if $Z_0$ is about 100 Ω, $Z_0'$ is also preferably about 100 Ω. Transmission line capacitor 10 is provided with terminations 18 to allow signals propagating along paths 14 to enter and exit the transmission line capacitor, thus receiving the benefits of AC coupling functionality while not being significantly affected by varied impedance between the transmission paths.

As mentioned, transmission line capacitor 10 as depicted in FIG. 1A includes two parallel capacitors 16. It should be appreciated that more than two capacitors 16 may be formed in accordance with the presently disclosed technology, while still remaining within the spirit and scope of the present subject matter. For example, a single device with four capacitors 16 may be designed for provision adjacent to four parallel signal traces on a circuit board 12. Aspects of designing a transmission line capacitor with two capacitors 16 is presented hereafter for the sake of convenience.

Figure 1B:
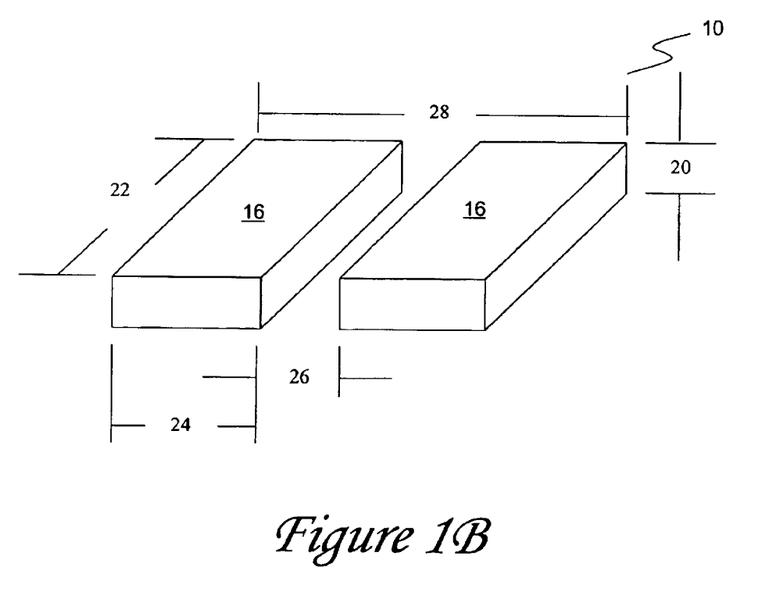
FIG. 1B provides a perspective view and representation of planar plate transmission lines for use in accordance with the design of transmission line capacitors of the present subject matter.

FIG. 1B provides a perspective representation of two parallel capacitors 16 as may be included in a transmission line capacitor 10 of the present technology. The following discussion with respect to FIG. 1B is intended to offer an understanding with respect to fundamentals of transmission line theory of how properties of such capacitors 16 are designed to offer specific capacitive function as well as maintain specific impedance properties.

It is necessary for purposes of such analysis to establish certain variables to represent certain dimensions of transmission line capacitor 10 and the respective capacitive structures 16. Distance 20 represents the height of the respective parallel capacitors 16, which corresponds to the distance between the topmost and bottommost active plates of capacitor 16, where each such capacitor may have more than two plates, and in some embodiments actually includes many active plates. Distance 22 represents the length of each respective capacitor 16, while distance 24 represents the width of each respective capacitor 16. The two capacitors are separated by spacing distance 26, such that distance 28 represents the respective widths 24 of both capacitors 16 plus spacing distance 26.

The two capacitors 16 of FIG. 1B can effectively be modeled as parallel planar plate transmission lines, for which the characteristic impedance $Z_0$ is given by the following:

$$Z_0 = \frac{\eta_0}{\sqrt{\varepsilon_r}} (A+B)^{-1}, \qquad \text{if } \frac{a}{b} \geq 1 \qquad (1)$$

$$Z_0 = \frac{\eta_0}{\pi\sqrt{\varepsilon_r}} \left[ \ln\left(\frac{4b}{a}\right) + \frac{1}{8}\left(\frac{a}{b}\right)^2 - C \right], \quad \text{otherwise}$$

where a=½ (distance 20), b=½ (distance 26), $\eta_0 \approx 120\ \pi\Omega$ (the intrinsic impedance of free space), e≈2.71828 (natural logarithmic base), $$\varepsilon_0 = \frac{10^{-9}}{36\pi} \text{ F/m (the permittivity of free space)},$$

$\varepsilon_r$ = the dielectric constant of the material separating capacitors 16, and A, B and C are given by the following formulas:

$$A = \frac{a}{b} + \frac{1}{\pi}\ln(4) + \frac{(\varepsilon_r - 1)}{2\pi\varepsilon_r^2}\ln\left(\frac{e\pi^2}{16}\right) \quad (2)$$

$$B = \frac{\varepsilon_r + 1}{2\pi\varepsilon_r}\ln\left(\frac{\pi e\left(\frac{a}{b} + 0.94\right)}{2}\right)$$

$$C = \frac{\varepsilon_r - 1}{2(\varepsilon_r + 1)}\left(\ln\left(\frac{\pi}{2}\right) + \frac{\ln\left(\frac{4}{\pi}\right)}{\varepsilon_r}\right)$$

Thus $Z_0 = Z_0(\varepsilon_r, a, b)$, and thus the characteristic impedance of the transmission line capacitor 10 represented in FIGS. 1A and 1B can be determined as a function of the dielectric constant of the material separating capacitors 16, the spacing distance between parallel capacitors 16 (distance 26) and the height of capacitors 16 (distance 20). If a characteristic impedance $Z_0$ of 100 Ω is desired, one can pick corresponding values for $\varepsilon_r$, spacing distance 26 and height 20 to suit any given application.

Figure 2A:
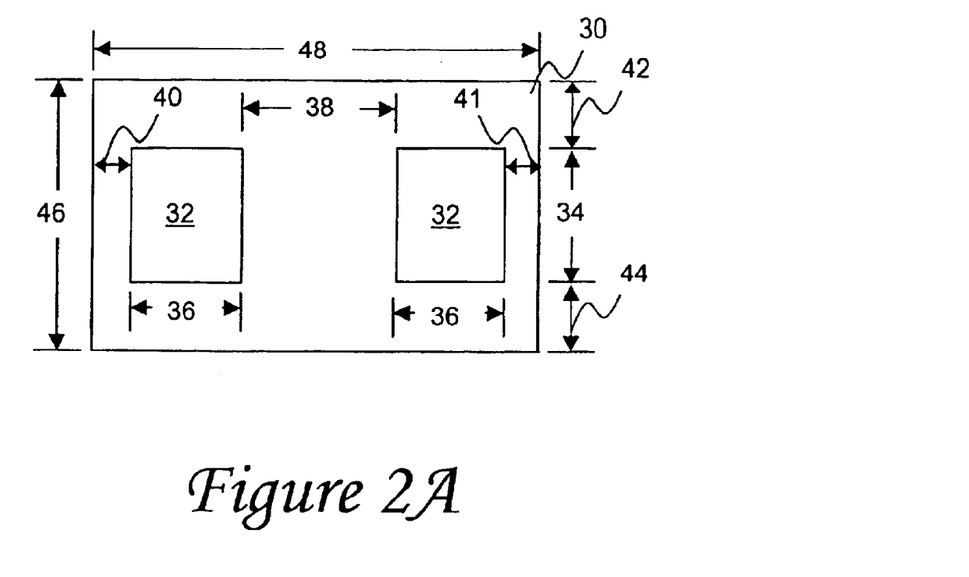
FIG. 2A provides a side elevation view of a first exemplary transmission line capacitor embodiment in accordance with the present subject matter.

It may be desirable to form a transmission line capacitor in accordance with the present subject matter that utilizes low temperature co-fired ceramic (LTCC) materials in its construction. Such LTCC materials are preferably characterized as having relatively low dielectric constants, such as on a range from about 5.0 to about 10.0, where a specific dielectric constant of 8.1 can be used to obtain values for the spacing and height of a transmission line capacitor. Consider first exemplary transmission line capacitor 30, a generally side view of which is depicted in FIG. 2A. Two parallel capacitors 32 each having respective height 34 and width 36 are positioned within embodiment 30 such that capacitors 32 are separated by distance 38. The capacitors 32 are further positioned within embodiment 30 with generally equivalent width margins 40 and 41, as well as top height margin 42 and bottom height margin 44. Embodiment 30, including capacitors 32 and the dielectric material surrounding capacitors 32 is characterized by an overall device height represented by distance 46 and an overall device width represented by distance 48.

Figure 3A:
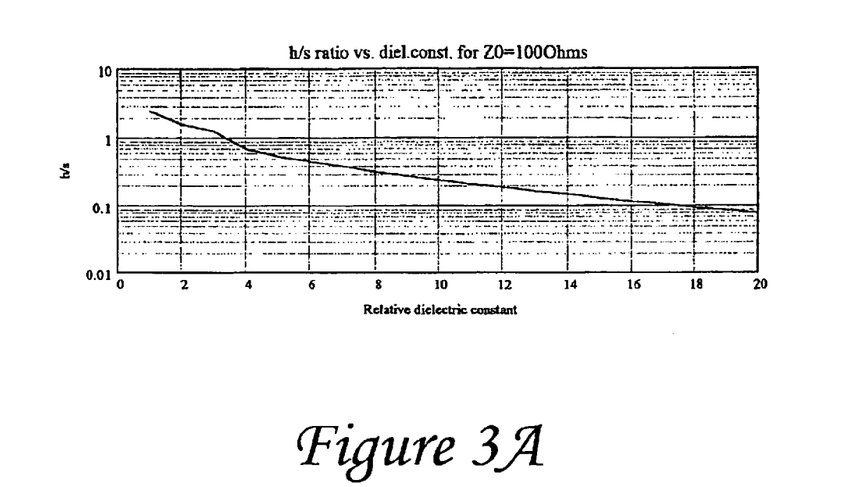
FIG. 3A provides a graphical representation of a height-spacing ratio versus the dielectric constant for the first exemplary transmission line capacitor embodiment of FIGS. 2A and 2B.
Figure 3B:
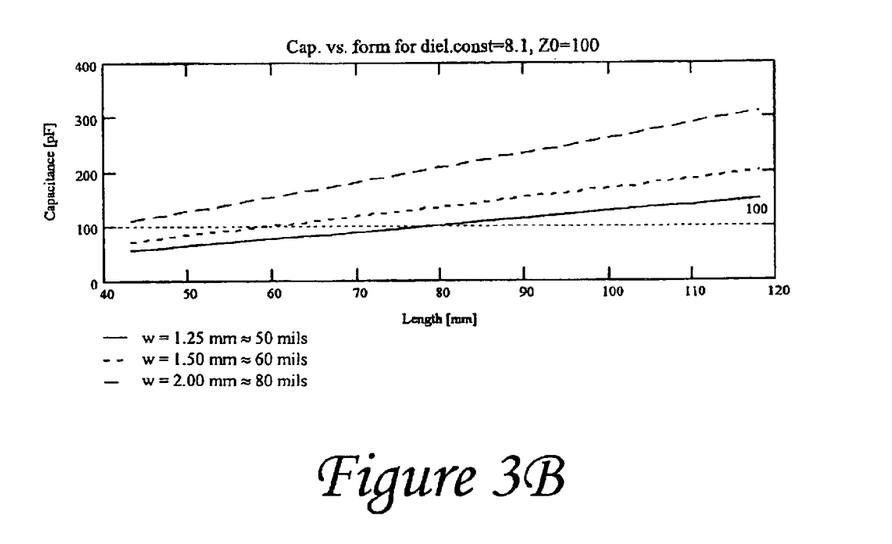
FIG. 3B provides a graphical representation of capacitance versus form dimensions for the first exemplary transmission line capacitor embodiment of FIGS. 2A and 2B.

Assume that it is desirable to have a characteristic impedance of about 100 Ω and for the dielectric material between capacitors 32 in embodiment 30 of FIG. 2A to be characterized by a dielectric constant of about 8.1. Utilizing the characteristic impedance formulas given in (1), it is thus determined that for the above exemplary performance characteristics it is desired to have a height to spacing ratio (distance 34/distance 38) of about 0.313. FIG. 3A provides a graphical representation of the relationship between the height to spacing ratio versus dielectric constant for a transmission line capacitor as depicted in FIG. 2A and having a given characteristic impedance of 100 Ω. Some particular examples of this relationship are given in Table 1 below.

TABLE 1

Exemplary Values for Design of First Transmission Line Capacitor Embodiment

| Dielectric Constant ($\varepsilon_r$): | Height to Spacing Ratio (distance 34/distance 38): |
|---|---|
| 1.0 | 2.476 |
| 2.7 | 1.338 |
| 8.1 | 0.313 |
| 15.0 | 0.130 |

Figure 2B:
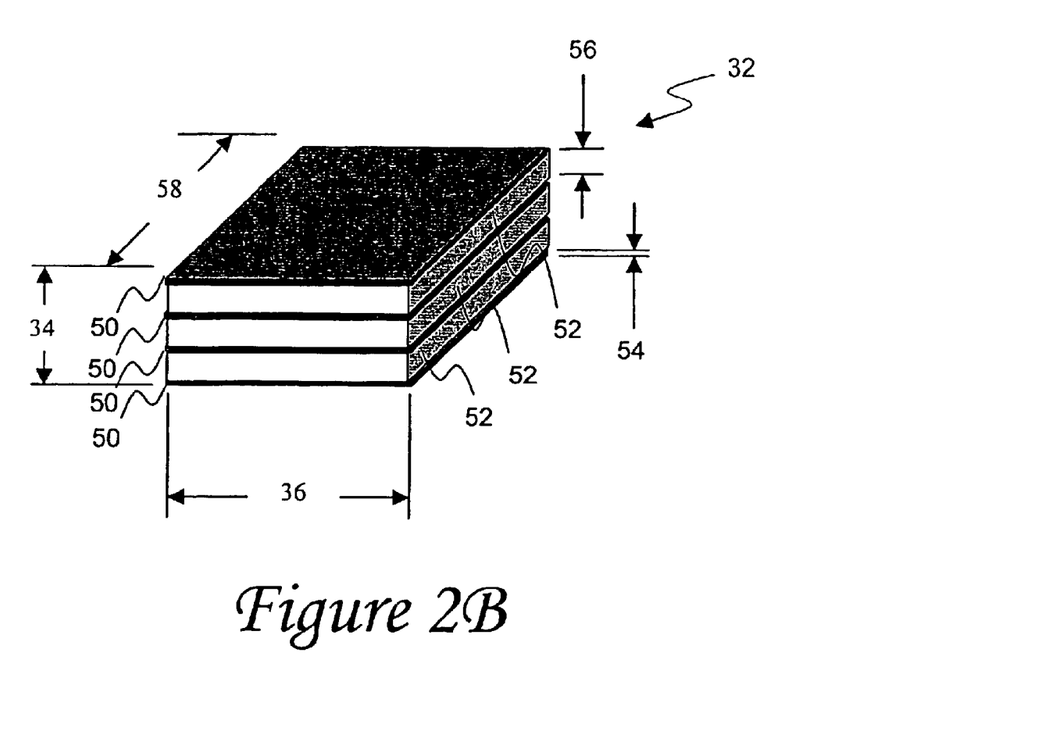
FIG. 2B provides a perspective view of aspects of the first exemplary transmission line capacitor embodiment of FIG. 2A.

When designing a transmission line capacitor embodiment such as first exemplary embodiment 30, it should be noted that the height and spacing are particularly important design aspects of such device. Thus, it is important also to account for the fact that the height 34 of each capacitor 32 includes not only the thickness of the dielectric material, but the thickness of each active conductive plate within the capacitor. It was previously mentioned that capacitor 32 may be characterized by a plurality of active plates connected together in parallel to yield respective multilayer capacitors. This is represented by the perspective depiction in FIG. 2B of an exemplary embodiment of a capacitive element 32 in transmission line capacitor 30. Multilayer capacitor 32 is preferably formed with a plurality of active electrode layers 50 separated by layers of dielectric material 52. Three dielectric layers 52 are illustrated in FIG. 2B for exemplary purposes only. It should be appreciated that many more layers may potentially be provided in accordance with transmission line capacitor embodiments of the present subject matter.

For exemplary calculation purposes, assume that the spacing 38 between capacitors 32 is about 300 µm and that each active layer 50 is formed by building up a layer of conductive metal to a thickness 54 of about 2.0 µm (about 0.079 mils). It was previously determined that a spacing to height ratio of 0.313 is desirable for a device having a dielectric constant of 8.1. Thus, for a given spacing 38 between capacitors 32 of 300 µm (11.81 mils), a capacitor height is preferably (0.313)*(300 µm)=93.96 µm (3.699 mils). So, to achieve a capacitor height of 93.96 µm, when the thickness 54 of each active layer 50 is 2.0 µm, and assuming a thickness 56 of each dielectric layer to be about 6.0 µm, the number (N) of combined layers (one active layer 50 and one dielectric layer 52) is determined as $$N = ceil\left(\frac{(9.396 \cdot 10^{-5}) - (2 \cdot 10^{-6})}{(6 \cdot 10^{-6}) + (2 \cdot 10^{-6})}\right) = ceil(11.49) = 12.$$

The ceil(x) function determines the next highest integer of x.

It may also be desired that each capacitor 32 provides a given capacitance function (for example, 100 pF). In order to determine the capacitance of each capacitor 32, the width 36 of each capacitor must be established. With an exemplary spacing 38 of 300 µm, margin distances 40 and 41 both about 125 µm, and an overall device distance 48 of about 1.25 mm, the width 36 of each capacitor 32 is determined to be about ½ [(distance 48)–(distance 40)–(distance 41)–(distance 38)]≈350 µm≈13.78 mils.

Given the width distance 36, the capacitance of capacitor 32 can be determined as a function of the length distance 58 (distance 22 in FIG. 1B) as follows $$C = \frac{\varepsilon_0\varepsilon_r(\text{distance 58})(\text{distance 36})(\text{number of combined layers})}{(\text{thickness of each dielectric layer})}.$$

Given an exemplary length distance 58 of about 2.0 mm, an exemplary width distance of about 350 µm, twelve exemplary layers, a thickness 56 per dielectric layer 52 of about 6.0 µm, a capacitance of about 100.4 pF is achieved. Noting that such capacitance (C) is dependent on the length and width of the capacitor 32, additional examples of potential combinations of such length and width and their resulting achieved capacitance is illustrated graphically in FIG. 3B. Three curves are presented in the graph of FIG. 3B, each depicting capacitance versus length for a different width (W) 36.

The above calculations are presented such that a transmission line capacitor is capable of being designed to fit any number of desirable criteria. In keeping with such exemplary calculations, it may further be useful to list some exemplary dimensions for the entire device embodiment 30 of FIG. 2A. A transmission line capacitor 30 is constructed with material having a dielectric constant of 8.1 and functions with a characteristic impedance of about 100 Ω. Assuming similar numbers as presented in the above examples, Table 2 below lists some exemplary dimensions for the width and length 58 of embodiment 30, as well as the resulting capacitance per capacitor 32.

TABLE 2

Exemplary dimensions and capacitance values for given design criteria (including $Z_0 = 100\,\Omega$.)

| Distance 48: (mils) | Distance 58: (mils) | Capacitance: (pF) |
|---|---|---|
| 50 | 60 | 100 |
| 60 | 60 | 100 |
| 80 | 40 | 100 |
| 50 | 100 | 125 |
| 50 | 120 | 150 |
| 60 | 80 | 136 |
| 60 | 100 | 170 |
| 60 | 120 | 204 |
| 80 | 80 | 207 |
| 80 | 100 | 260 |
| 80 | 120 | 312 |

Figure 4A:
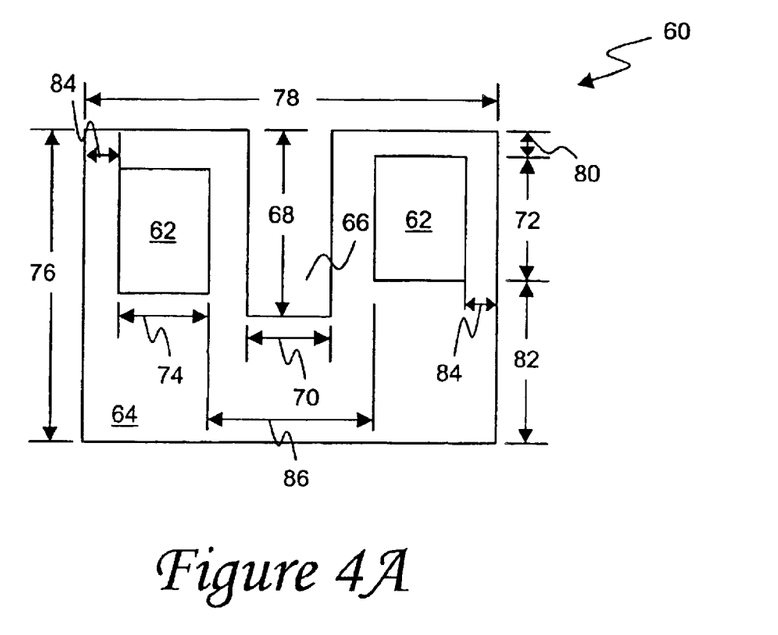
FIG. 4A provides a side elevation view of a second exemplary transmission line capacitor embodiment in accordance with the present subject matter.

It may not always be preferable to use a low K dielectric material when forming transmission line capacitors in accordance with the present subject matter. Thus, a second exemplary embodiment is presented that may better utilize materials with a relatively higher dielectric constant. FIG. 4A provides a side view of a second exemplary transmission line capacitor embodiment 60 in accordance with the presently disclosed technology. Such second embodiment 60 includes two parallel capacitors 62 formed in similar fashion to the capacitors 32 of first exemplary embodiment 30. The dielectric material utilized in such capacitors 62 and in the surrounding dielectric portion 64 may correspond to any number of materials, including NPO (COG), a relatively low-K X7R (such as one having a dielectric constant (K) of about 2000), a relatively high-K X7R (such as one having a dielectric constant (K) of about 3000), Z5U, and/or Y5V. As is known to one of ordinary skill in the art, it should be noted that X7R is a relatively high-K material, wherefore a dielectric constant of 2000 is relatively low for X7R and 3000 is relatively high for such exemplary materials. These are provided merely as examples of dielectric materials for use with any of the exemplary embodiments presented herein, and it should be appreciated that other dielectric materials can also be utilized with the subject transmission line capacitors while still remaining within the spirit and scope of the present technology. In fact, although aspects of the present technology are presented for use with relatively high K and/or relatively low K dielectric materials, it should be appreciated that materials with any particular dielectric constant may be adapted for use with select embodiments of the disclosed technology.

A channel 66 is formed within transmission line capacitor 60 by cutting out a portion with a height 68 and width 70 in between the two capacitors 62. Each capacitor 62 has a respective exemplary height 72 and width 74. The overall transmission line capacitor may be represented as having height 76 and width 78. Capacitors 62 are positioned within the transmission line capacitor with a top marginal distance 80 and bottom marginal distance 82. Side margins 84 may also be provided within transmission line capacitor 60, and the overall spacing between capacitors 62 is defined as distance 86.

With a transmission line capacitor formation such as embodiment 60 of FIG. 4A, the dielectric constant ($\in_r$) of the material between transmission paths will be a combination of the dielectric constant ($\in_{r1}$) for material 64 used in the capacitor body and the dielectric constant ($\in_{r2}$) of the material present in channel 66. For such second exemplary embodiment 60, channel 66 may be filled simply with air, which has a dielectric constant of about 1.0. For purposes of the following exemplary evaluation, assume that channel height 68 is greater than the combined value of distance 80 and distance 72. The equivalent dielectric constant ($\in_r$) between the two parallel capacitors 62 can then be determined as a function of the channel width 70, as follows:

$$\varepsilon_r = \frac{\varepsilon_{r1} \cdot (\text{distance 86} - \text{distance 70})}{\text{distance 86}} + \frac{\varepsilon_{r2} \cdot (\text{distance 70})}{\text{distance 86}} \quad (3)$$

Figure 4B:
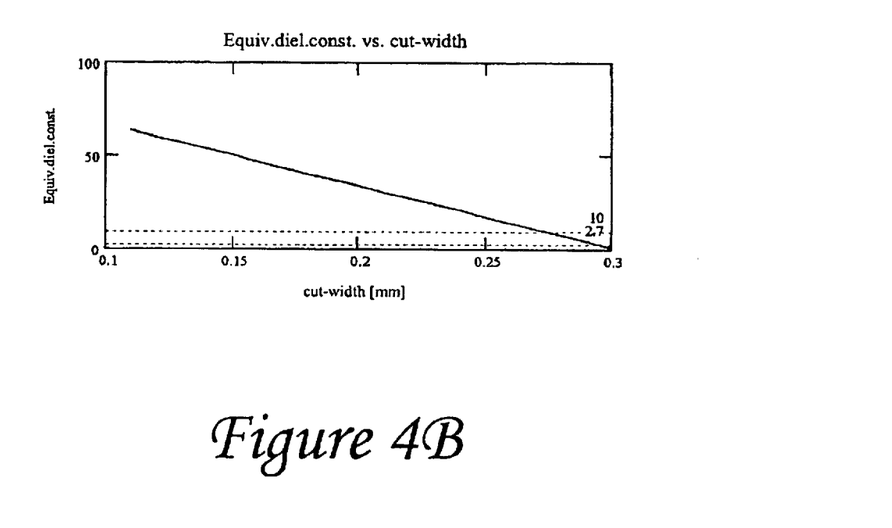
FIG. 4B provides a graphical representation of the equivalent dielectric constant versus cut-width for the second exemplary transmission line capacitor embodiment of FIG. 4A.

For exemplary calculation purposes, assume that $\in_{r1}$=100.0 and that $\in_{r2}$=1.0. If a value of $\in_r$=10 is desired, then (3) can be solved to determine that distance 70 needs to be 0.273 mm. Similarly, if a value of $\in_r$=20 is desired, then (3) can be solved to determine that distance 70 needs to be 0.242 mm. FIG. 4B provides a graphical representation of the equivalent dielectric constant ($\in_r$) versus cut-width for embodiment 60 of FIG. 4A assuming that $\in_{r1}$=100.0 and that $\in_{r2}$=1.0.

The exemplary numerical analysis presented above with respect to the second transmission line capacitor embodiment 60 is provided merely as an example of how to form a transmission line capacitor embodiment having a channel portion formed therein in accordance with the present technology. It should be noted from the exemplary data that the channel area needs to be cut quite precisely in order to ensure a given equivalent dielectric constant ($\in_r$) between capacitors 62. Thus, it may be preferred to fill the channel area 66 with another dielectric material having a slightly higher dielectric constant than air. It may be especially preferred to fill the channel area 66 with another dielectric material other than air whenever distance 70 approaches distance 68. This would help ensure that none of the active electrode layers within capacitors 62 remain exposed.

Figure 5A:
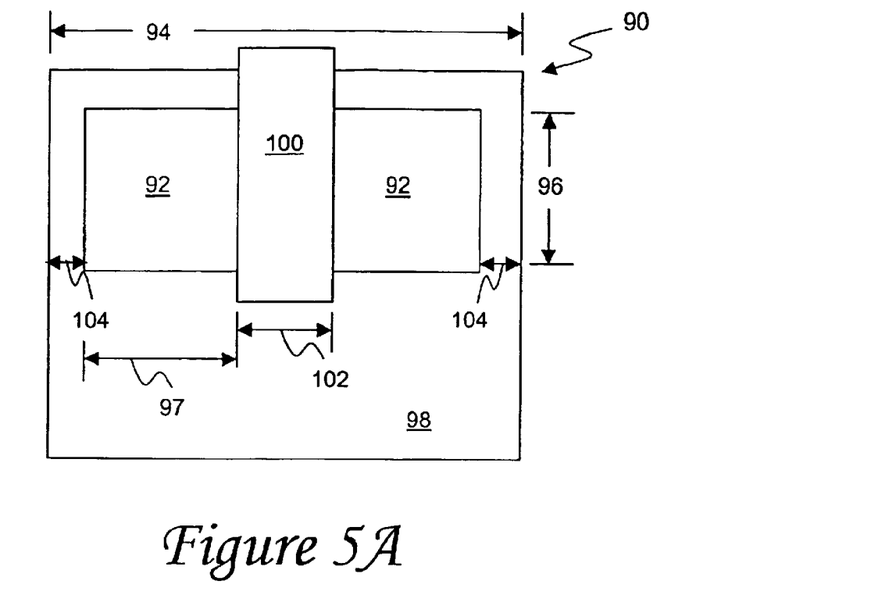
FIG. 5A provides a side elevation view of a third exemplary transmission line capacitor embodiment in accordance with the present subject matter.

Now referring to FIG. 5A, a third exemplary transmission line embodiment 90 provides two parallel capacitors 92 in a monolithic structure having width 94. Each capacitor 92 is preferably characterized by height 96 and width 97. A dielectric material 98 having dielectric constant ($\in_{r1}$) is provided around a substantial portion of the respective capacitors 92. Capacitors 92 may be formed separately, or may be formed as a single capacitor in which a channel is then cut through in a generally middle portion thereof. The channel is defined as having width 102 which may then be filled with a passivation material 100 having a dielectric constant ($\in_{r2}$). An example of materials for potential use in embodiment 90 of FIG. 5A (or other embodiments) is an NPO (COG) material for dielectric 98 and a glass or epoxy material for dielectric 100. Capacitors 92 may further be positioned within transmission line capacitor 90 such that side margins are provided with respective distances 104.

For exemplary calculation purposes, assume that the spacing 102 between capacitors 92 is about 300 $\mu$m and that each capacitor 92 is formed with multiple active layers (such as represented in FIG. 2B). Each active layer in capacitor 92 can be formed by building up a layer of conductive metal to a thickness of about 2.0 $\mu$m (about 0.079 mils), and arranged with margin distances 104 of about 125 $\mu$m (4.921 mils). Given spacing distance 102, margin distance 104, and assuming an overall device width 94 of 1.25 mm, the width 97 of each capacitor 92 is determined to be about 350 $\mu$m (2.808 mils).

Given the width and spacing dimensions for embodiment 90 of FIG. 5A, as well as the dielectric constant ($\varepsilon_{r2}$) for material 100, and assuming that it is desired to have a characteristic impedance $Z_0$ between capacitors 92 of about 100 Ω, one can solve the formulas provided in (1) to determine a height value 96 that would satisfy the equations.

In order to achieve a given capacitor height 96, when the thickness of each active layer is about 2.0 μm and assuming a thickness of each dielectric layer to be about 6.0 μm, the number (N) of combined layers (one active layer and one dielectric layer) needed to achieve height 96 is determined as $$N = ceil\left(\frac{(\text{distance } 96) - (2 \cdot 10^{-6})}{(6 \cdot 10^{-6}) + (2 \cdot 10^{-6})}\right) = 21.$$

In order to determine the capacitance of each capacitor 92, the dimensions of each capacitor are needed. The capacitance of each capacitor 92 can be determined as a function of such dimensions as follows:

$$C = \frac{\varepsilon_0 \varepsilon_r (\text{cap. width})(\text{cap. length})(N)}{(\text{thickness of each dielectric layer})}.$$

Figure 5B:
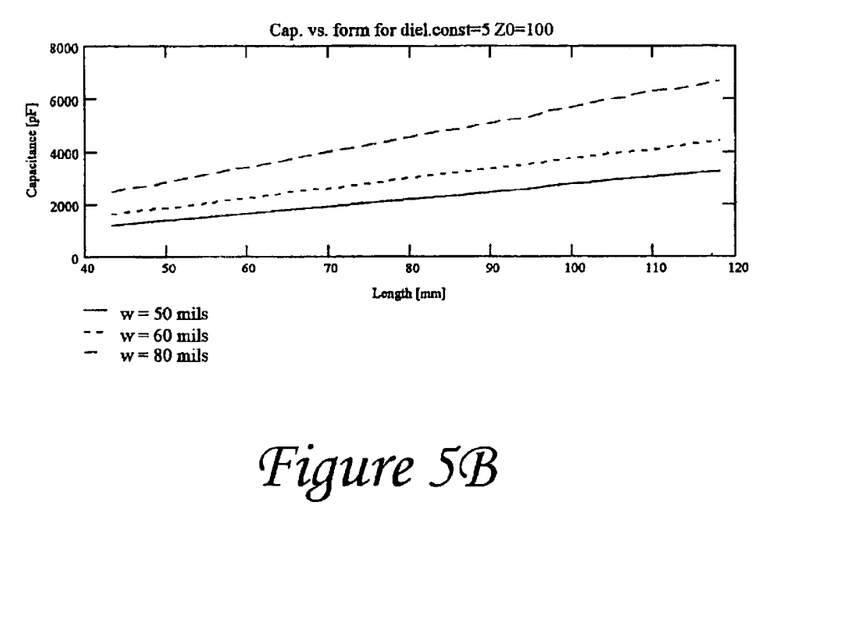
FIG. 5B provides a graphical representation of capacitance versus form dimensions for the third exemplary transmission line capacitor embodiment of FIG. 5A.

Examples of potential combinations of the length and width and their resulting achieved capacitance is illustrated graphically in FIG. 5B. Three curves are presented in the graph of FIG. 5B, each depicting capacitance versus length for a different width.

Figure 6A:
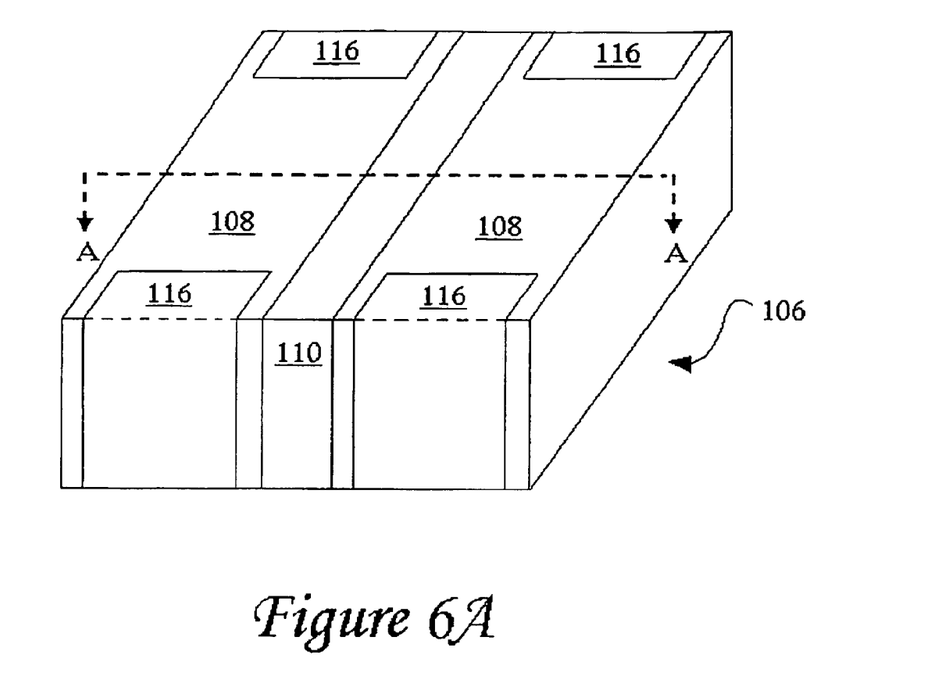
FIG. 6A provides a perspective view of a fourth exemplary transmission line capacitor embodiment in accordance with the present subject matter.
Figure 6B:
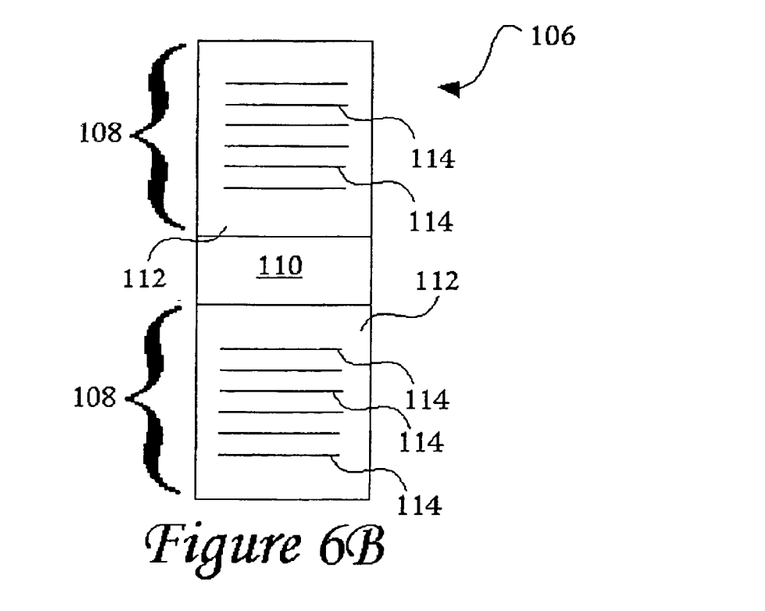
FIG. 6B provides a generally side cross-sectional view of the fourth exemplary transmission line capacitor of FIG. 6A as taken along cut line A—A thereof and rotated at about a 90-degree angle.

A fourth exemplary embodiment 106 of the present subject matter is directed to a transmission line capacitor as illustrated in FIGS. 6A and 6B. Such transmission line capacitor 106 may include at least two capacitive portions 108 formed with a first dielectric material and positioned between a separation portion 110 formed with a second dielectric material.

Referring more particularly to FIG. 6B, such figure is a cross-sectional view of capacitor 106, taken along cut line A—A of FIG. 6A and rotated about 90 degrees. Such cross-sectional view is intended to help provide an understanding of how capacitor 106 may be formed using a punch press type technology. Once the dimensions of transmission line capacitor 106 are determined utilizing transmission line theory and formulas (aspects of which are disclosed herein), a device as depicted in FIGS. 6A and 6B can be constructed. Embodiment 106 may be formed utilizing thin-film technology, such as a high pressure lamination press (also known as a punch press).

Layers of a first dielectric material 112 are provided with active conductive electrode layers 114 selectively interleaved therewith. Alternating active layers 114 and dielectric material 112 yield first capacitive portion 108. The provision of layers of dielectric material 112 is then interrupted to provide layers of a second dielectric material 110. Dielectric material 110 may have a relatively low dielectric constant compared to that of dielectric material 112. After providing a sufficient amount of dielectric material 110 to achieve the given capacitance and impedance properties of transmission line capacitor 106, a second capacitor portion 108 is formed by providing layers of the first dielectric material 112 interleaved with additional active layers 114. To produce a symmetrical device, the first and second capacitor portions may be generally equivalent structures with regards to relative size and overall performance characteristics.

Each of the many layers discussed with respect to the fourth exemplary embodiment 106 may be punched into a cavity mold and laminated under high pressure. The device 106 may then be ejected from the cavity mold and fired. Terminations 116 may then be provided along the fired component to provide electrical connection to the respective capacitor portions 108. Such terminations 116 are configured in an opposite direction than other conventional multilayer capacitor terminations. It should be appreciated that aspects of punch press technology in forming fourth exemplary embodiment 106 of the transmission line capacitor subject matter may also be applied to other embodiments of the disclosed technology. Furthermore, aspects of other transmission line capacitor embodiments as presented herein may also be applied to the embodiment discussed with respect to FIGS. 6A and 6B.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A monolithic transmission line capacitor comprising:
   a body composed of a first dielectric material;
   at least two multilayer capacitors disposed within said body, each multilayer capacitor characterized by a respective capacitor height;
   wherein said at least two multilayer capacitors are positioned substantially parallel to one another thereby providing a substantially constant spacing distance between said at least two multilayer capacitors;
   wherein each of said at least two multilayer capacitors is composed of a plurality of electrodes interleaved among a plurality of insulating substrates;
   wherein said insulating substrates are composed of a second dielectric material;
   wherein each of said at least two multilayer capacitors further comprises first and second terminations respectively connected to selected of said plurality of electrodes thereby providing a capacitor-signal-path through each respective multilayer capacitor; and
   wherein each said capacitor height, said spacing distance and said first dielectric material are selected to yield a predetermined capacitor-signal-path to capacitor-signal-path impedance for the monolithic transmission line capacitor.

2. A monolithic transmission line capacitor as in claim 1, wherein said capacitor-signal-path to capacitor-signal-path impedance substantially equals the line-to-line impedance between two signal paths external to said transmission line capacitor and respectively connected to said first terminations of said at least two multilayer capacitors.

3. A monolithic transmission line capacitor as in claim 1, wherein said capacitor-signal-path to capacitor-signal-path impedance is about 100 ohms.

4. A monolithic transmission line capacitor as in claim 1, wherein said at least two multilayer capacitors have substantially the same height, substantially the same length and substantially the same width.

5. A monolithic transmission line capacitor as in claim 1, wherein at least one capacitor attribute from the group of attributes consisting of (1) multilayer capacitor length, (2)

multilayer capacitor height, (3) multilayer capacitor width, (4) number of electrodes comprising said plurality of electrodes and (5) type of said second dielectric material, is selected to yield a predetermined capacitance value for each of said adjacent multilayer capacitors while substantially maintaining said predetermined capacitor-signal-path to capacitor-signal-path impedance.

6. A monolithic transmission line capacitor as in claim 1, wherein selected of said first and second dielectric materials are composed of a material selected from the group consisting of NPO (COG), a low-K X7R, a high-K X7R, Z5U and Y5V.

7. A monolithic transmission line capacitor as in claim 1, wherein said first dielectric material has a dielectric constant of greater than about 50.

8. A monolithic transmission line capacitor as in claim 1, wherein said first dielectric material is composed of a high-K dielectric material and said second dielectric material is composed of a low-K dielectric material.

9. A monolithic transmission line capacitor as in claim 1, wherein said first dielectric material and said second dielectric material are composed of a low-K dielectric material.

10. A monolithic transmission line capacitor as in claim 1, wherein said second dielectric material has a dielectric constant of less than about 20.

11. A monolithic transmission line capacitor as in claim 1, wherein said second dielectric material is a co-fired ceramic material.

12. A monolithic transmission line capacitor as in claim 1, wherein said first dielectric material and said second dielectric material are composed of the same material.

13. A monolithic transmission line capacitor, comprising:
a body composed of a first dielectric material;
at least two multilayer capacitors disposed within said body, each said multilayer capacitor being characterized by a multilayer capacitor height;
wherein said at least two multilayer capacitors are positioned substantially parallel to one another thereby providing a substantially constant spacing distance between said at least two multilayer capacitors;
wherein each of said at least two multilayer capacitors is composed of a plurality of electrodes interleaved among a plurality of insulating substrates;
wherein said body comprises a channel formed within said spacing distance, said channel being characterized by a channel width and filled with a second dielectric material;
wherein each of said at least two multilayer capacitors further comprises first and second terminations respectively connected to selected of said plurality of electrodes thereby providing a capacitor-signal-path through each respective multilayer capacitor; and
wherein selected of said multilayer capacitor height, said channel width, said first dielectric material and said second dielectric material are selected to yield a predetermined capacitor-signal-path to capacitor-signal-path impedance for said monolithic transmission line capacitor.

14. A monolithic transmission line capacitor as in claim 13, wherein said capacitor-signal-path to capacitor-signal-path impedance substantially equals the line-to-line impedance for two external transmission lines connected to respective terminations of said at least two multilayer capacitors.

15. A monolithic transmission line capacitor as in claim 13, wherein said second dielectric material is air.

16. A monolithic transmission line capacitor as in claim 13, wherein said channel width is substantially equal to the width of said spacing distance.

17. A monolithic transmission line capacitor as in claim 13, wherein said first dielectric material has a dielectric constant of greater than about 50.

18. A monolithic transmission line capacitor as in claim 13, wherein said second dielectric material is one of glass material and epoxy material.

19. A monolithic transmission line capacitor as in claim 13, wherein said plurality of insulating substrates are composed of a third dielectric material.

20. A monolithic transmission line capacitor as in claim 19, wherein said at least two multilayer capacitors have substantially the same height, substantially the same length and substantially the same width.

21. A monolithic transmission line capacitor as in claim 20, wherein at least one capacitor attribute from the group of attributes consisting of (1) said height, (2) said length, (3) said width, (4) number of said plurality of electrodes and (5) type of said third dielectric material, is selected to yield a predetermined capacitance value for each of said multilayer capacitors while maintaining said capacitor-signal-path to capacitor-signal-path impedance.

22. A monolithic transmission line capacitor as in claim 19, wherein selected of said first dielectric material and third dielectric material is composed of a material selected from the group consisting of NPO (COG), a low-K X7R, a high-K X7R, Z5U and Y5V.

23. A monolithic transmission line capacitor as in claim 19, wherein said second dielectric material has a dielectric constant of less than about 20.

24. A monolithic transmission line capacitor, comprising:
at least two adjacent multilayer capacitors wherein each multilayer capacitor is disposed within a body, each said body being composed of a first dielectric material, wherein each said body is separated from an adjacent body by a spacing layer composed of a second dielectric material;
wherein each of said multilayer capacitors is composed of a plurality of electrodes interleaved among a plurality of insulating substrates;
wherein each of said multilayer capacitors further comprise first and second terminations respectively connected to selected of said plurality of electrodes thereby providing a capacitor-signal-path through each respective multilayer capacitor;
wherein the width of said spacing layer is substantially equal to the distance between two external signal paths connected to respective of said first terminations of said adjacent multilayer capacitors; and
wherein selected of multilayer capacitor height, the type of said first dielectric material and the type of said second dielectric material is selected to yield a predetermined capacitor-signal-path to capacitor-signal-path impedance for said adjacent multilayer capacitors.

25. A monolithic transmission line capacitor as in claim 24, wherein said capacitor-signal-path to capacitor-signal-path impedance substantially equals the line-to-line impedance for said external signal paths.

26. A monolithic transmission line capacitor as in claim 24, wherein said capacitor-signal-path to capacitor-signal-path impedance is about 100 ohms.

27. A monolithic transmission line capacitor as in claim 24, wherein said first dielectric material is composed of a high-K dielectric material and said second dielectric material is composed of a low-K dielectric material.

28. A monolithic transmission line capacitor as in claim 24, wherein said second dielectric material has a dielectric constant in the range from about 5.0 to about 10.0.

29. A monolithic transmission line capacitor as in claim 24, wherein said second dielectric material is a co-fired ceramic material.

30. A monolithic transmission line capacitor as in claim 24, wherein said plurality of insulating substrates is composed of a third dielectric material.

31. A monolithic transmission line capacitor as in claim 30, wherein selected of said first dielectric material, said second dielectric material and said third dielectric material is composed of a material selected from the group consisting of NPO (COG), a low-K X7R, a high-K X7R, Z5U and Y5V.

32. A monolithic transmission line capacitor as in claim 24, wherein said first dielectric material has a dielectric constant at least about 50 and wherein said second dielectric material has a dielectric constant of less than about 20.

* * * * *